United States Patent [19]

van Dongeren

[11] 4,341,392
[45] * Jul. 27, 1982

[54] PLASTICS PIPES HAVING WALLS WITH LENGTHWISE EXTENDING CHANNELS

[75] Inventor: Jan P. van Dongeren, Bergentheim, Netherlands

[73] Assignee: Wavin B.V., Zwolle, Netherlands

[*] Notice: The portion of the term of this patent subsequent to Jul. 28, 1998, has been disclaimed.

[21] Appl. No.: 221,360

[22] Filed: Dec. 29, 1980

Related U.S. Application Data

[60] Division of Ser. No. 904,218, May 9, 1978, Pat. No. 4,280,534, which is a continuation of Ser. No. 728,117, Sep. 30, 1976, abandoned.

[51] Int. Cl.$^3$ .............................................. F16J 15/10
[52] U.S. Cl. ............................... 277/207 A; 138/109; 138/155; 138/148; 138/115; 285/138; 285/344; 285/345

[58] Field of Search ............... 138/109, 148, 115, 172, 138/155; 277/207 A; 285/344, 345, 138

[56] References Cited

U.S. PATENT DOCUMENTS 3,464,450  9/1969  Steffenini ........................ 138/172 X
4,034,994  7/1977  Ohta et al. ....................... 277/207 A
4,280,534  7/1981  van Dongeren ................... 138/109

Primary Examiner—James E. Bryant, III
Attorney, Agent, or Firm—Wigman & Cohen

[57] ABSTRACT

Plastic pipes comprising an inner and outer wall being interconnected by lengthwise extending connecting partitions, forming channels, the ends of the channels being each separately sealed by sealingly pressing the end walls of a channel to each other after these walls have been heated to a temperature surpassing the plasticizing temperature.

4 Claims, 7 Drawing Figures

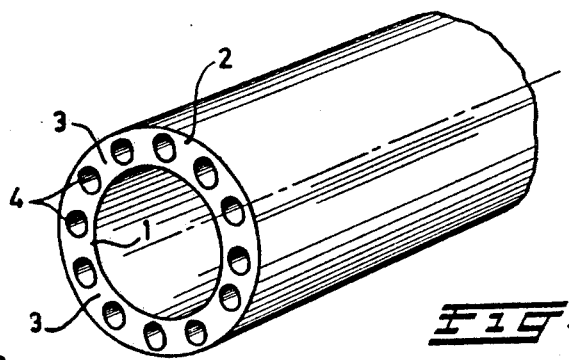
FIG:1.
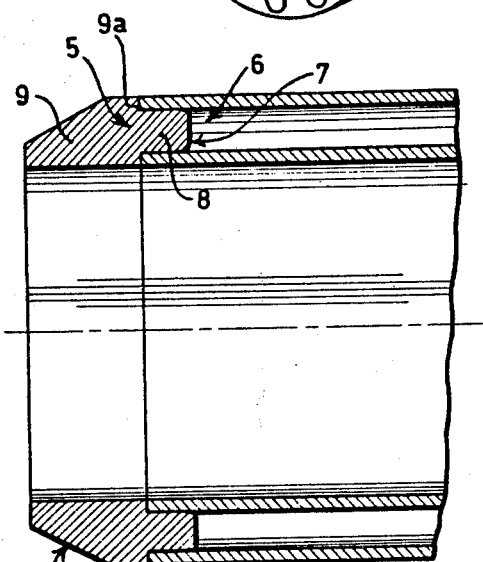
FIG:2.
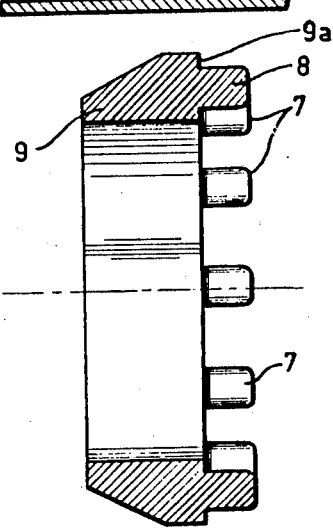
FIG:3.

PLASTICS PIPES HAVING WALLS WITH LENGTHWISE EXTENDING CHANNELS

This is a division of application Ser. No. 904,218, filed May 9, 1978, now U.S. Pat. No. 4,280,534, which in turn is a continuation of Ser. No. 728,117, filed Sept. 30, 1976, now abandoned.

BACKGROUND OF THE INVENTION

This invention relates to plastics pipe comprising an inner wall and an outer wall which are interconnected by lengthwise extending connecting partitions forming lengthwise extending channels.

Such plastics pipes with lengthwise extending channels which are delimited by an inner and an outer wall are known per se.

When in use in pipe lines, the outer wall may be damaged so that ground water can penetrate through openings or cracks in said outer wall into the lengthwise extending channels. This groundwater then mixes with waste liquids transmitted by the aforementioned pipe lines.

Plants for sewage purification which purify the sewage water supplied by the pipe lines can thus be loaded with large quantities of groundwater which need not be purified.

In case of damage or openings in the outer wall, waste water from the pipe lines may also flow into the continuous channels and issue via these continuous channels and openings or cracks in the outer wall, which gives rise to serious pollution of the soil.

SUMMARY OF THE INVENTION

The present invention provides a plastics pipe of the aforementioned type which is not subject to the abovementioned disadvantages.

Each channel is provided with a channel closing wall which ends at some distance from the nearest free end of the pipe, from which it follows that each channel is individually closed. This solution prevents liquid from issuing from the pipe line or entering pipe line when the outer wall is damaged. This can never be achieved by using a cap, since in case of damage to such a cap the channels would also be subject to passing liquid.

Each channel closing wall is advantageously part of a projection mounted on a ring, which ring extends to beyond the aforementioned free end of the plastics pipe. For the purpose of introducing such a pipe into a socket, one end part of this ring is conveniently beveled.

The channel closing wall consists of a plastics wall integral with the pipe, obtained by pressing the channel walls against each other at the end of a channel.

As the channel closing wall is integral with the pipe body, leakage of liquids through the lengthwise extending channels is entirely eliminated.

The pipe is advantageously provided with a socket end and optionally with a groove for accomodating a sealing member.

The invention relates in another aspect to a method for manufacturing a plastics pipe comprising an inner wall and outer wall which are connected by lengthwise extending connecting partitions forming lengthwise extending channels. At the ends of a channel, its walls, after been heated to above the plasticizing temperature, are pressed sealingly against each other, which operation provides a plastics pipe having efficiently sealed longitudinal channels.

When pressing the walls of a channel against each other, after heating to above the plasticizing temperature, the end of the pipe is subjected to a rotary motion, which is advantageous in that, when the channels are closed, the risk of creases is entirely avoided.

In order to subject the pipe to a rotary motion, after its end has been heated, it is slid into a mandril having a flange arranged from outside which conically tapers toward the free end of the pipe. Simultaneously a small rotation is imparted to the flange.

Because of this small rotation, the cross-sections of the continuous channels gradually deform until the walls of a channel adjoin each other entirely.

When the channels are sealed by heating the plastics material to above the plasticizing temperature and pressing the channel walls to each other, the pipe can advantageously be provided with an end socket by widening the former.

BRIEF DESCRIPTION OF THE DRAWINGS

FIG. 1 is a perspective view of a known plastics pipe with lengthwise extending non-sealed channels;

FIG. 2 is a cross section of a first embodiment of a pipe according to the invention having sealed channels by means of channel closing walls;

FIG. 3 is a cross section through a sealing in a pipe of FIG. 2, in order to obtain channel closing walls in each of the channels;

DESCRIPTION OF A PREFERRED EMBODIMENT

Figure 4:
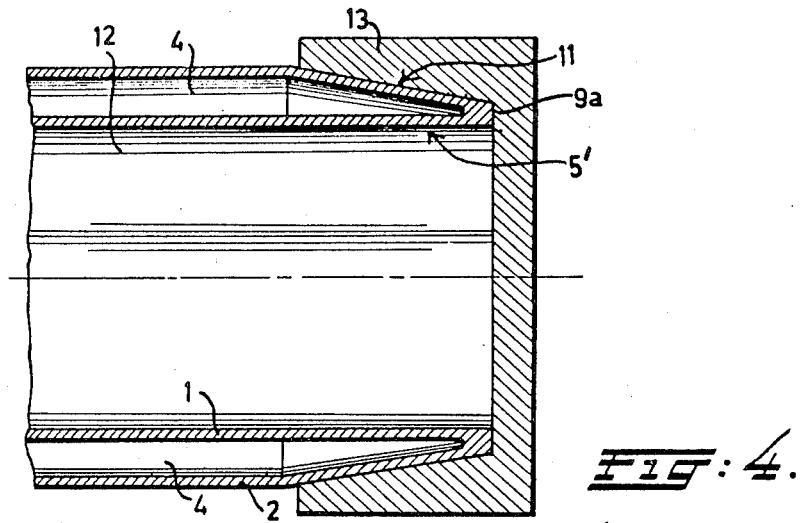
FIG. 4 is another embodiment of a plastic pipe according to the invention with sealed ends of the lengthwise extending channels.
Figure 5:
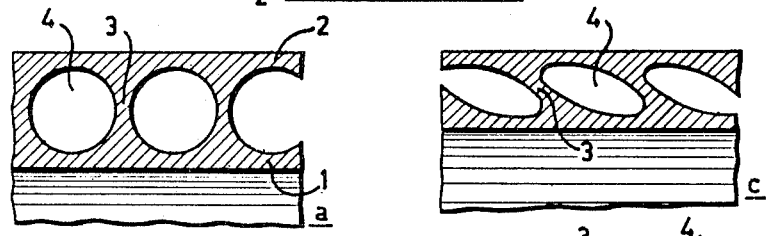
FIGS. 5a to 5d show details of the cross-sectional shape of the channel openings of a pipe according to the invention when a conical rotating closing ring is used.

The perspective view in FIG. 1 shows a known plastics pipe comprising an inner wall 1 and an outer wall 2 interconnected by lengthwise extending connecting partitions 3 forming lengthwise extending channels 4. Although, in this embodiment, the axis of the longitudinally extending channels is parallel to the axis of the plastics pipe this is not necessarily so, as the connecting partitions may be provided such that slightly spirally extending longitudinal channels are produced.

Plastics pipe of this type are known and can be used for conveying waste liquids, particularly in sewage disposal pipe lines. However, they present the disadvantage that liquid with components suspended therein can flow through the channels themselves. The latter construction is rather inconvenient when, e.g., the outer wall of such a pipe is more or less damaged, while the inner wall of the plastics pipe is not damaged.

Such a situation may easily arise since these known pipes are manufactured particularly in order to decrease the consumption of plastics material in the pipes, especially by forming a thin inner wall 1 and a thin outer wall 2.

When, for instance, the outer wall 2 is more or less damaged, liquid can easily penetrate through the lengthwise extending channels 4 into the pipe lines. The purification plants then have to purify more sewage water than the pipelines normally transmit. Specifically, groundwater can flow into a pipe line through channels 4 when they are open and thereby mix with sewage water.

Water purification already consumes much energy, which consumption increases significantly when the liquid to be purified contains groundwater. In cases of damage to the outer wall 2 when the lengthwise extending channels 4 are open, a second possibility is that liquids will issue from the pipe line through the channels 4 and openings in the outer wall, which may cause serious soil pollution. So as to alleviate all the aforementioned difficulties each channel has at its end 5 a channel closing wall 6, according to the present invention.

FIGS. 2 and 3 show a first embodiment of a plastics pipe according to the invention, that is to say, a plastics pipe with a channel closing wall 6. This channel closing wall 6 is an end wall 7 of a cylindrical projection 8 arranged on a ring 9. The cylindrical projections are situated at the ends of the channels 4 and extend for a small part of their length, for example 1 or 2 mm, into the channels from their free ends 9a, which are nearest to the end wall 7.

In order to obtain a proper sealing, the cylindrical projections 8 may be provided with a sealing glue coat, but they can also be fused with the inner wall of a lengthwise extending channel having a cylindrical cross-section.

Ring 9 has a chamfered edge 11 on its front side 10 so that the pipe can more easily be used in a spigot and socket joint. It is also possible to widen the part of the ring 9, situated outside the channels 4, so as to form a socket and to provide the latter with an inner groove for receiving sealing means. When the ends shown in FIG. 2, having a chamfer, and such a socket are combined, then such pipes can be sealingly interconnected, whereby any risk of liquid passing through the channels is eliminated. The ring 9 with the cylindrical projections consists of the same plastics material as that of the pipes with lengthwise extending channels.

FIG. 4 shows another embodiment of a plastics pipe wherein at the ends 5' of a channel the walls of a channel are sealingly pressed against each other after having been heated above the plasticizing temperature. In order to carry out such an operation, an end 5' of a plastics pipe with lengthwise extending channels between an inner and an outer wall is heated and thereupon slid into a mandril 12 after which a flange 13, conically tapering toward the end zone of the pipe, is slid over the outside of the pipe, so that the walls of the channels 4 are pressed together and the desired sealing is obtained. In order to prevent the formation of creases during this operation, a small rotation is imparted to the flange 13 when sliding the same over the end of the plastic pipe. This rotation is taken up by the free part 9a causing the partitions 3 to be gradually deformed. The cross-sections of the channels 4 initially deform into an elliptic shape, gradually becoming more elliptic. Finally, the walls completely contact each other and fuse owing to the temperature of the plastics material, while forming a sealing thereof. Due to the conical shape of the flange 13, a pipe with a beveled edge 11 is produced.

FIGS. 5a to 5d show details of the cross-sectional shape of the channel opening of a pipe according to the present invention when the conical rotating flange is acting thereon. Obviously, the channels are entirely confined in the proximity of the end zone 5' of the pipe due to the rotary motion, whereas the cross-section of the channels as seen from said end 5' gradually increases. Such a pipe with sealed end zones of the channels 4 has been found to be very convenient in practice.

Figure 6:
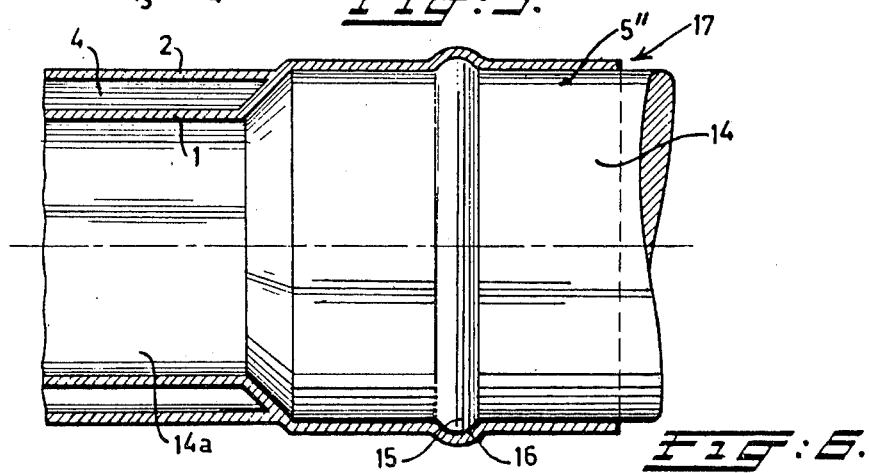
FIG. 6 shows a pipe according to the invention having a socket with an inner groove.

FIG. 6 shows a slightly different embodiment of the plastic pipe having an end zone 5" widened by means of a widening pin 14 having an annular elevation 15 by which a groove 16 is produced. When the socket 17 is formed, a small rotation is imparted is imported to the widening pin 14 in order to avoid the formation of creases in the plastics pipe. In order to maintain the inside diameter of the pipe in the part which is not to be widened, the widening pin 14 has a part 14a, the diameter of which corresponds to the inside diameter of the original plastics pipe.

The method described hereinbefore for sealing longitudinally extending channels by means of a ring 9 with cylindrical projections 8 advantageously lends itself to sealing channels at a building site where sawed-off pipe lengths are used which should be provided with a sealing in each of the longitudinally extending channels. The operation of sealing the longitudinally extending channels by means of a mandril 12 and a flange 13 is more suitable when effected in factories.

Figure 7:
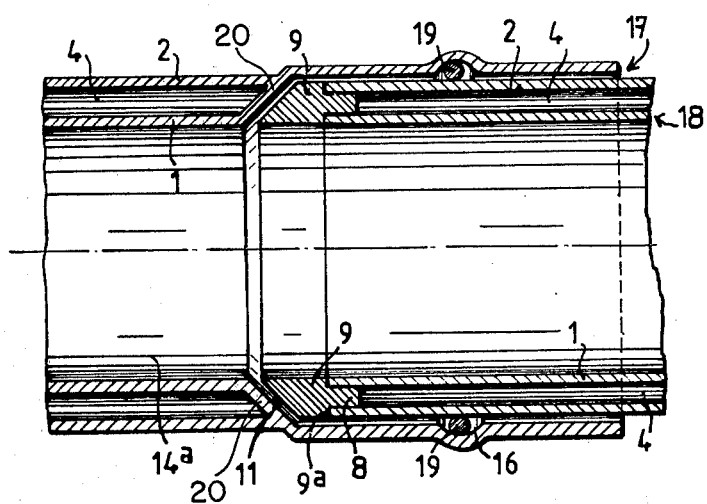
FIG. 7 shows a pipe system according to the invention including a double-walled pipe.

The pipe system comprises a first plastic pipe, shown in FIGS. 6 and 7, and a second plastic pipe 18, shown in FIGS. 2 and 7, interconnected in a form-fitting manner with each other. Both first and second plastic pipes are double-walled, each comprising an inner wall 1 and an outer wall 2. The walls 1 and 2 are interconnected by connecting partitions 3, shown in FIGS. 1 and 5, forming longitudinal channels 4 extending lengthwise of the first and second pipes. At least one end of the first pipe, shown best in FIG. 7, has a conical channel closing wall 20 formed by a diverging conical portion of its inner wall 1 directed toward and integrally formed with its outer wall 2 adjacent the one end of the first pipe. A generally cylindrical socket 17 is integrally formed with the walls 1 and 2 of the first pipe and extends for a distance beyond the end wall 20 of the first pipe.

The socket 17 receives internally therein a mating end of the second pipe 18. The inner walls 1, the outer walls 2, the partitions 3, the channel closing end wall 20, and the socket 17 of the first pipe are all integrally formed together in one piece from the same plastic material.

The second pipe 18 has a converging conical channel closing wall 11 at the mating end thereof for engaging the diverging conical portion 20 of the first pipe.

The pipe system includes a seal 19, shown in FIG. 7, which fits into the annular groove 16, shown in FIGS. 6 and 7, between the socket 17 of the first pipe and the mating end of the second pipe 18 for sealing therebetween.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. A plastic pipe system adapted for underground use comprising at least a first plastic pipe and a second plastic pipe interconnected with each other, said first and second plastic pipes each comprising an inner wall and an outer wall, said walls being interconnected by connecting partitions forming channels extending lengthwise of said first and second pipes, at least one end of said first pipe having a conical channel closing wall formed by a diverging conical portion of its inner wall directed toward and integrally formed with its outer wall adjacent said end of said first pipe and a generally cylindrical socket means integrally formed with the walls of the first pipe and extending for a distance beyond the end of said first pipe for receiving internally therein a mating end of said second pipe, said inner and outer walls, said partitions, said channel closing walls and said socket means of said first pipe all being integrally formed together in one piece from the same plastic material, said second pipe having a converging conical channel closing wall at the mating end thereof for engaging the diverging conical portion of said first pipe.

2. The pipe system according to claim 1, including seal means arranged between said socket means of the first pipe and said mating end of the second pipe for sealing therebetween.

3. The pipe system according to claim 1, wherein said converging conical channel closing wall of said second pipe comprises a converging portion of the outer wall of said second pipe and terminates at the free end thereof.

4. The pipe system according to claim 1, including a ring having projections on one side thereof extending into said channels and terminating at a distance from the adjacent free end of the second pipe, said ring having a conical surface on the other side thereof, said ring defining said converging conical channel closing wall of said second pipe.

* * * * *